United States Patent
Canady et al.

(10) Patent No.: US 11,572,080 B2
(45) Date of Patent: Feb. 7, 2023

(54) SENSOR DEGRADATION MONITOR

(71) Applicant: Zoox, Inc., Foster City, CA (US)

(72) Inventors: Christopher David Canady, Redwood City, CA (US); Ryan McMichael, Mountain View, CA (US); Irene Perali, Mountain View, CA (US); Alejandro Ruiz, Newark, CA (US)

(73) Assignee: Zoox, Inc., Foster City, CA (US)

( * ) Notice: Subject to any disclaimer, the term of this patent is extended or adjusted under 35 U.S.C. 154(b) by 479 days.

(21) Appl. No.: 16/728,910

(22) Filed: Dec. 27, 2019

(65) Prior Publication Data

US 2021/0197859 A1 Jul. 1, 2021

(51) Int. Cl.
| | |
|---|---|
| *B60W 60/00* | (2020.01) |
| *G01S 17/931* | (2020.01) |
| *G05D 1/02* | (2020.01) |
| *G07C 5/08* | (2006.01) |
| *G07C 5/00* | (2006.01) |

(Continued)

(52) U.S. Cl.
CPC .......... *B60W 60/0015* (2020.02); *B60S 1/56* (2013.01); *B60W 50/0205* (2013.01); *B60W 50/038* (2013.01); *G01S 7/497* (2013.01); *G01S 17/931* (2020.01); *G05D 1/0231* (2013.01); *G06V 10/507* (2022.01); *G07C 5/008* (2013.01); *G07C 5/0808* (2013.01); *H04N 17/002* (2013.01); *B60W 2050/0215* (2013.01); *B60W 2420/42* (2013.01); *B60W 2420/52* (2013.01); *B60W 2555/20* (2020.02)

(58) Field of Classification Search
CPC ......... B60W 60/0015; B60W 50/0205; B60W 50/038; B60W 2050/0215; B60W 2420/42; B60W 2420/52; B60W 2555/20; B60S 1/56; G01S 7/497; G01S 17/931; G01S 15/931; G01S 2007/4977; G05D 1/0231; G06V 10/507; G06V 10/25; G06V 10/993; G07C 5/008; G07C 5/0808; G07C 5/006; H04N 17/002
USPC ........................................................ 701/24
See application file for complete search history.

(56) References Cited

U.S. PATENT DOCUMENTS

| | | |
|---|---|---|
| 9,734,455 B2 | 3/2017 | Levinson et al. |
| 10,310,509 B1 * | 6/2019 | Ferguson ................ G01S 13/58 |

(Continued)

OTHER PUBLICATIONS

The PCT Search Report and Written Opinion dated Mar. 18, 2021 for PCT application No. PCT/US20/66630, 11 pages.

*Primary Examiner* — Muhammad Shafi
(74) *Attorney, Agent, or Firm* — Lee & Hayes, P.C.

(57) ABSTRACT

Techniques for determining a degraded state associated with a sensor are discussed herein. For example, a sensor associated with vehicle may captured data of an environment. A portion of the data may represent a portion of the vehicle. Data associated with a region of interest can be determined based on a calibration associated with the sensor. For example, in the context of image data, image coordinates may be used to determine a region of interest, while in the context of lidar data, a beam and/or azimuth can be used to determine a region of interest. A data metric can be determined for data in the region of interest, and an action can be determined based on the data metric. For example, the action can include cleaning a sensor, scheduling maintenance, reducing a confidence associated with the data, or slowing or stopping the vehicle.

16 Claims, 5 Drawing Sheets

(51) Int. Cl.
*B60S 1/56* (2006.01)
*B60W 50/02* (2012.01)
*B60W 50/038* (2012.01)
*H04N 17/00* (2006.01)
*G01S 7/497* (2006.01)
*G06V 10/50* (2022.01)

(56) References Cited

U.S. PATENT DOCUMENTS

| | | | |
|---|---|---|---|
| 2018/0190046 A1* | 7/2018 | Levinson | G08G 1/056 |
| 2018/0342113 A1* | 11/2018 | Kislovskiy | G07C 5/008 |
| 2019/0324450 A1* | 10/2019 | Lurie | H04L 9/3236 |
| 2019/0391578 A1 | 12/2019 | Tariq et al. | |
| 2021/0051317 A1* | 2/2021 | Yan | G06T 7/80 |
| 2021/0096262 A1* | 4/2021 | Vets | G01S 7/484 |

\* cited by examiner

SENSOR DEGRADATION MONITOR

BACKGROUND

A vehicle can use sensors to capture sensor data to detect objects in an environment. Accurate determinations of object characteristics can assist, for example, an autonomous vehicle to traverse the environment. However, the quality of the data collected by sensors may become degraded in certain circumstances, including based on environmental factors such as weather, traffic, or road conditions, as well as based on internal errors or malfunctions that may occur within the sensors themselves. In such cases, the data collected by the vehicle sensors may be suboptimal or even unsuitable for use, potentially impacting vehicle navigation, obstacle detection and avoidance, and other vehicle functions that rely on the sensor data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
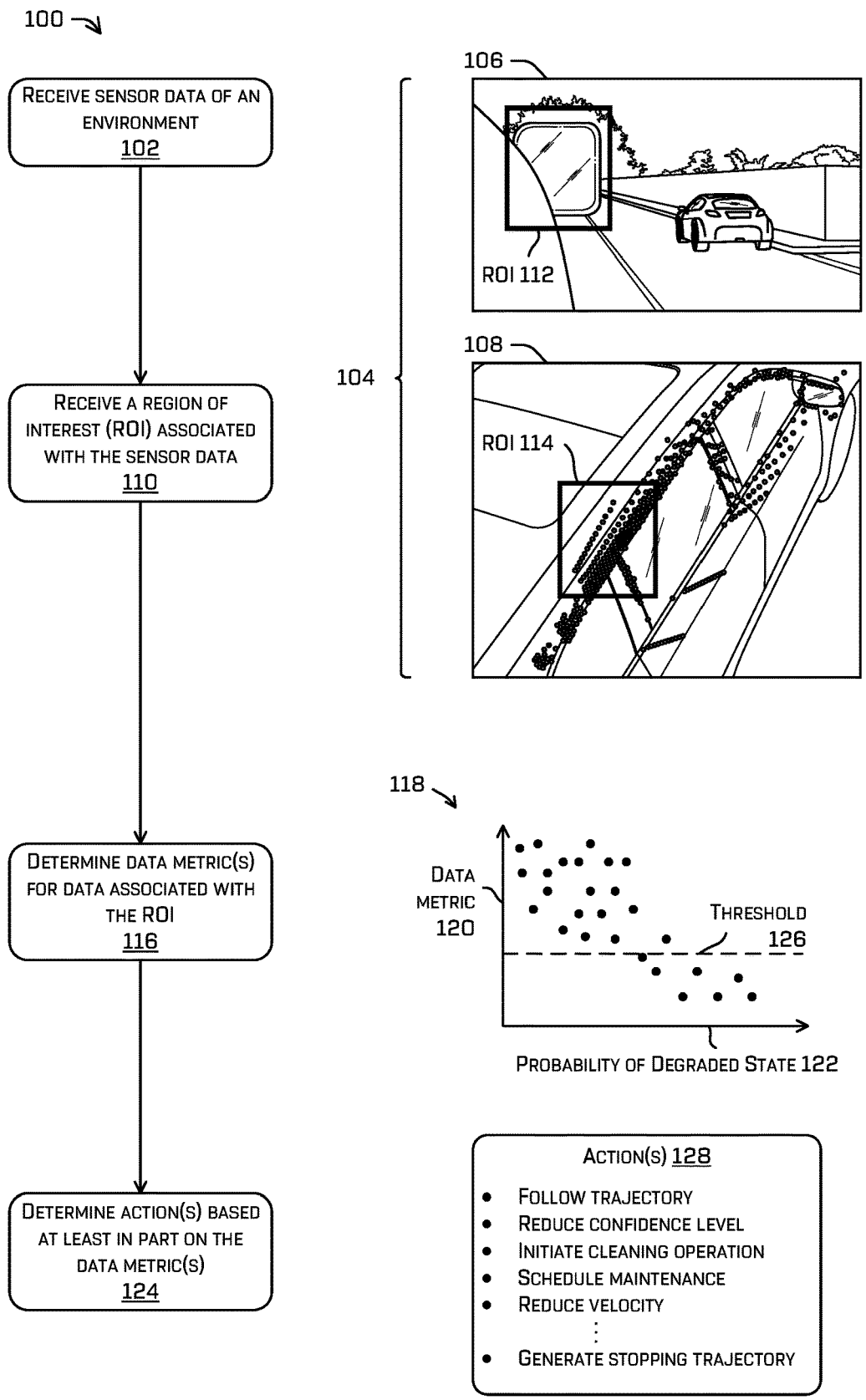
FIG. 1 is a pictorial flow diagram of an example process of determining a data metric indicative of a degraded sensor and performing an action based on the data metric.

Techniques for determining a degraded state associated with a sensor are discussed herein. Such sensors may include, but are not limited to, an image sensor, a lidar sensor, a time-of-flight sensor, a radar sensor, a sonar sensor, and the like. The techniques may include receiving sensor data from a sensor associated with a vehicle. A portion of the sensor data may represent a portion of the vehicle, such as an exterior portion of the vehicle. A region of interest (ROI) can be determined based on a calibration associated with the sensor. For example, in the context of image data, image coordinates may be used to determine a ROI, while in the context of lidar data, a beam and/or azimuth can be used to determine a ROI. Further, sensor data associated with the ROI can be evaluated to determine a data metric, which can be used to determine a degraded state associated with the sensor. In some examples, the degraded state can represent an error associated with the sensor such as a defocusing error, a lens error, and the like. In some examples, the degraded state can represent an environment state, such as rain, snow, or heavy fog. In some examples, an action can be determined based on the data metric. For example, the action can include cleaning a sensor, scheduling maintenance, reducing a confidence associated with the sensor data or data derived from the sensor data, or slowing or stopping the vehicle.

In any one or more of the examples described herein, the techniques may be performed using limited computer resources. In at least some such examples, the techniques may be performed on a "backup" processing unit such that, in the event of a failure of a more powerful compute resource, degradation may still be monitored.

In the context of an image sensor, data metrics can include, but are not limited to, a contrast metric (e.g., based on intensity data from different portions within the ROI), a number or location of edges, features, and/or corners within the ROI, an absence or presence of corners, and the like. In some examples, a ROI for image data can be based at least in part on a calibration indicating particular regions or image coordinates that correspond to surface(s) or region(s) associated with the vehicle. In one example, the ROI can correspond to regions of a surface of a vehicle that include two colors such that a contrast ratio can be determined based on image data associated with the particular regions.

In the context of a lidar sensor, data metrics can include, but are not limited to, a number of lidar points within the ROI, an intensity value of data within the ROI, a distance associated with data in the ROI, a comparison between captured data and a reference data (e.g., when comparing an expected versus a measured depth data, using an iterative closest point (ICP) algorithm), and the like. In some examples, a ROI for lidar data can be based at least in part on a channel or beam index associated with the lidar data and/or an azimuth angle or azimuth bin associated with the lidar data. For example, based on a calibration, lidar data associated with a particular beam index and azimuth angle can be predetermined to correspond to a surface or portion of the vehicle. Data determined based on a calibration can be used to determine data metrics, as discussed herein.

In some examples, incorporating a portion of the vehicle in the ROI provides a constant reference for robust techniques to evaluate a state of a sensor in changing environments.

In some examples, the data metric can be determined relative to a baseline computation, which may be based on a calibration. In some examples, the data metric can be normalized based on environment conditions such as ambient lighting, time of day, weather, sensor age, and the like. In some examples, the data metric can be compared to one or many thresholds or bins and an action can be determined based on the data metric. For example, for a data metric representing a first degradation level (e.g., representing a slightly degraded sensor), the action may represent a cleaning action or sending a message to a remote computer to schedule a maintenance. In some examples, for a data metric representing a second degradation level (e.g., representing a higher level of degradation), the action may represent reducing a confidence level or weight associated with the sensor data or data derived from the sensor data (e.g., a bounding box, a classification, segmentation data, etc.), reducing a velocity of the vehicle with respect to a planned velocity, and/or stopping the vehicle.

A data metric can be evaluated using a model generated based at least in part on empirically measured data and/or simulated data. For example, a data metric can be evaluated for sensor data captured in an environment. The sensor data can be input to a component such as a perception component to detect objects and/or to determine information about such objects. For example, image data or lidar data can be used to detect an object, such as a pedestrian, as well as a bounding box associated with the object (e.g., two-dimensional or three-dimensional bounding box), segmentation information, classification information, pose (e.g., orientation), velocity information, extent (e.g., length, width, and/or height), and the like. The output of the perception component can be evaluated with respect to a ground truth (or expected outputs which, in at least some examples, may be precomputed) to identify errors in the perception output. Data metrics can be evaluated with respect to the output of various models or components to evaluate a performance of systems with respect to a data metric.

A model associated with data metric(s) can be determined based on simulation(s), in some cases. For example, sensor data can be degraded in a simulation and evaluated with respect to a component (e.g., a perception component, a localization component, a prediction component, and the like) to determine a performance of such systems based on data associated with particular data metrics. Simulation data can be aggregated to determine a performance of a sensor based on a variety of data metrics.

In some examples, various data metrics can be evaluated for a single sensor and/or across multiple sensors of the same or different sensor type. For example, an image contrast ratio that is within a threshold value across multiple image sensors and that represents a degraded state may indicate an environmental condition such as fog. In some examples, data metrics for a single sensor can evaluated, such as a contrast ratio and edge detection, to determine a degraded state. Further examples are discussed herein.

Various actions can be determined based on a type and/or severity of data metrics. For example, a model component can include various thresholds, bins, or bands that represent actions to be selected based on such data metrics. For example, a first data metric may result in a first action (e.g., initiating a sensor cleaning operation), while a second data metric may result in a second action (e.g., controlling a vehicle to slow or stop). Example actions may include, but are not limited to, one or more of reducing a confidence level associated with one or more of the sensor data or data derived from the sensor data, sending an indication of the data metric to a remote computing device, sending a request associated with a maintenance operation to the remote computing device, initiating a sensor cleaning operation, modifying a trajectory to slow the vehicle, generating a trajectory to stop the vehicle, and the like.

In some examples, a data metric can be evaluated over time to evaluate a state of a sensor. Such historical data metric data can be used to predict a performance of a sensor and/or can indicate when a sensor may fail. In some examples, predictive maintenance can be scheduled, initiated, or otherwise determined based on such historical data metrics.

The degradation estimation techniques described herein can improve a functioning of a computing device by providing a robust method of estimating or otherwise determining a degraded state associated with a sensor (and/or of an environment). For example, determining whether a sensor is associated with a degraded state can allow subsequent processes such as classification, tracking, prediction, route planning, trajectory generation, and the like to be performed more accurately, may require less processing power, and/or may require less memory. In some instances, faster and/or more accurate segmentation can be used in generating a trajectory of an autonomous vehicle, which can improve safety for occupants of an autonomous vehicle. In some examples, the techniques can be used in a self-test operation associated with a system to evaluate a performance of the system on startup and/or at any regular or irregular intervals, which provides for greatly improved overall reliability and safety outcomes. Further, the techniques discussed herein may be incorporated into a system that can be validated for safety. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques can be utilized in a manufacturing assembly line context, in an aerial surveying context, or in a nautical context. Additionally, the techniques described herein can be used with real data (e.g., captured using sensor(s)), simulated data (e.g., generated by a simulator), or any combination of the two.

FIG. 1 is a pictorial flow diagram of an example process 100 of determining a data metric indicative of a degraded sensor and performing an action based on the data metric.

An operation 102 can include receiving sensor data of an environment. An example 104 illustrates receiving image data 106 of a first environment. The example 104 also illustrates an example of receiving lidar data 108 of a second environment. The first and second environments may include any number of objects. At least a portion of the sensor data may be associated with a portion of a vehicle (or other object associated with a sensor), as discussed herein. In some examples, the operation 102 can be performed by an autonomous vehicle as it traverses the environment.

In some examples, the operation 102 can be initiated based on a trigger event and/or at any regular or irregular interval. For example, the operation 102 can be initiated as part of a self-test operation, such as at startup of the vehicle. In some examples, the operation 102 can be initiated when an environmental condition meets a predefined condition (discussed below). In some examples, the operation 102 can be initiated when an amount of available processing meets or exceeds a threshold (e.g., so as not to conflict with other operations).

An operation 110 can include receiving a region of interest (ROI) associated with the sensor data. In the image data 106, an ROI 112 can be received or otherwise determined based on calibration data, which may indicate image coordinates indicative of the sensor data corresponding to the vehicle. In the lidar data 108, an ROI 114 can be received or otherwise determined based on a beam index and/or on an azimuth angle associated with a lidar sensor. In some examples, a ROI can be determined dynamically (e.g., based on determining that a portion of the sensor data corresponds to the vehicle). Additional examples of determining the ROI 112 and the ROI 114 are discussed in connection with FIGS. 2 and 3, respectively, as well as throughout this disclosure.

An operation 116 can include determining data metric(s) for data associated with the ROI. In the context of image data, data metrics can include, but are not limited to, one or more of a contrast metric (e.g., based on intensity data from different portions within the ROI), a number or location of edges within the ROI, an absence or presence or corners, combinations of data metrics, and the like. In some examples, the data metric can be normalized based on environmental conditions, such as ambient light, time of data, location, weather, and the like. Additional details of the data metric(s) are discussed in FIG. 2, as well as throughout this disclosure.

In the context of lidar data, data metrics can include, but are not limited to, a number of lidar points within the ROI, an intensity value of data within the ROI, a distance associated with data in the ROI, a comparison between captured data and a reference data (e.g., using an iterative closest point (ICP) algorithm), combinations of data metrics, and the like. Additional details of the data metric(s) are discussed in FIG. 3, as well as throughout this disclosure.

An example 118 illustrates a graph of a data metric 120 with respect to a probability that the data metric represents a degraded state 122 (also referred to as a probability of degraded state 122 or a probability 122). Such an example can represent historical data metric data captured over time and evaluated with respect to a performance of subsequent processing, such as via a perception component, a localization component, a prediction component, and the like, as discussed herein. The example 118 may represent data captured, evaluated, or otherwise determined based on real data and/or simulated degraded sensors and/or environmental conditions.

Examples of determining a probability of an error associated with a component, such as a perception component, can be found, for example, in U.S. patent application Ser. No. 16/708,019 titled "Perception Error Models" and filed Dec. 9, 2019, the entirety of which is herein incorporated by reference.

An operation 124 can include determining action(s) based at least in part on the data metric(s). For example, the operation 124 can include evaluating a data metric with respect to a threshold 126 associated with the probability 122. Based at least in part on the data metric, one or more actions of the action(s) 128 can be selected or otherwise determined. For example, if the data metric meets or exceeds the threshold 126 the data metric may be indicative of normal or designed behavior of the sensor, in which case an action may be selected to follow a planned trajectory. If the data metric is below the threshold 126 another action of the action(s) 128 may be selected. Additional actions(s) may be selected or otherwise determined based on thresholds in addition to the threshold 126.

In some examples, the action(s) 128 may include, but are not limited to, following a trajectory (e.g., without modification of the trajectory), reducing a confidence level associated with the sensor data or data derived from the sensor data (e.g., bounding boxes, extents, pose, velocity, classification data, segmentation data, prediction data, etc.), initiating a cleaning operation, scheduling maintenance (e.g., which may include sending an indication of the data metric and/or the sensor data to a remote computing device), reducing a velocity associated with a trajectory (or modifying some other aspect of the trajectory), generating a stopping trajectory, and the like.

Examples of identifying and mitigating obstructions associated with sensors can be found, for example, in U.S. patent application Ser. No. 15/837,953 titled "Sensor Obstruction Detection and Mitigation" and filed Dec. 11, 2017, and U.S. patent application Ser. No. 16/728,532 titled "Sensor Degradation Detection and Remediation" and filed Dec. 27, 2019, the entirety of both of which are herein incorporated by reference.

Figure 2:
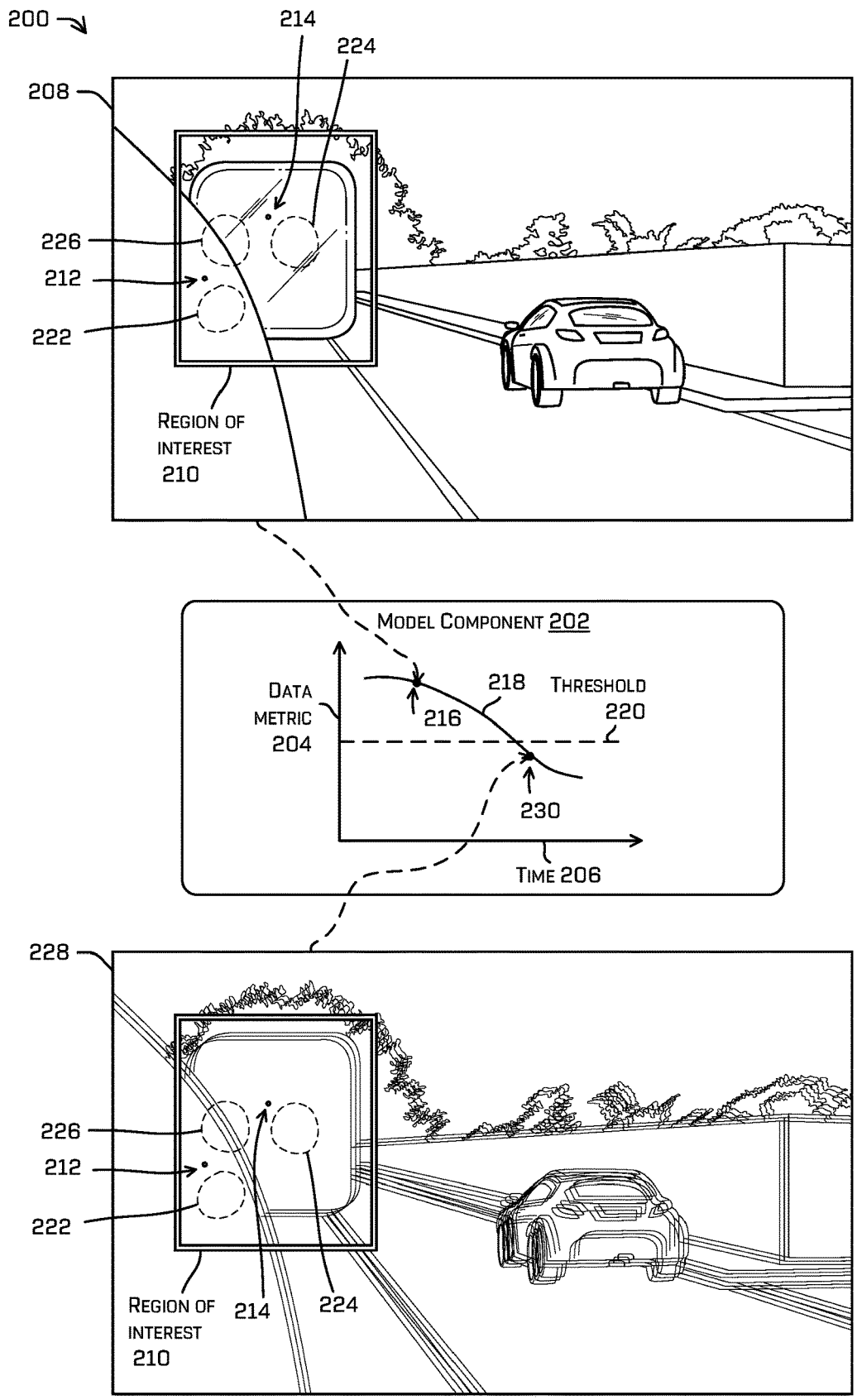
FIG. 2 is an illustration of an example model component based on data metrics associated with image data.

FIG. 2 is an illustration 200 of an example model component based on data metrics associated with image data. For example, a model component 202 can represent data indicative of a data metric 204 associated with a sensor over time 206. The model component can be generated based on captured data over time and/or captured data that has been degraded in simulation to represent a degraded sensor. Further, the model component 202 can include or represent a data metric based on environmental conditions such as ambient light, weather, temperature, time, location, and the like.

The illustration 200 includes a first example of image data 208 representing normal sensor data. Data metrics can be determined based on the image data 208. For example, a region of interest (ROI) 210 can be received, whereby at least a portion of the ROI 210 can comprise a portion of the vehicle. In the image data 208, a data metric can be evaluated based on individual points or regions within the ROI 210.

As illustrated, the ROI 210 includes a first point 212 and a second point 214. The first point 212 may be associated with a first intensity value, and the second point 214 can be associated with a second intensity value. The intensity values for each point 212 and 214 can be determined based on a calibration operation which can establish a baseline metric, such as intensity value. Further, the calibration operation can be performed over a variety of environmental conditions (e.g., ambient light, time of data, temperature, weather, and the like) to allow for normalization of data. A contrast metric can be determined based on the intensity values associated with the points 212 and 214. For example, a contrast metric can be determined based on a Weber fraction. For example, where an intensity of the first point 212 is represented as $I_1$ and an intensity of the second point 214 is represented as $I_2$, a contrast metric can be determined as:

$$\frac{I_1 - I_2}{I_2}.$$

In some examples, the intensity $I_1$ can represent an intensity of a lighter feature of the vehicle and the intensity $I_2$ can represent an intensity of a darker features of the vehicle, whereby the features used in $I_1$ and $I_2$ (e.g., the points 212 and 214, respectively), are known points of the vehicle (or sensor platform).

In normal operations (e.g., illustrated by the image data 208) a data metric may be expected to fall within a particular range (e.g., based on empirical studies and/or simulation data). For example, a data metric 216 associated with the image data 208 is illustrated in the model component 202 on a curve 218. As discussed herein, image data associated with various data metrics can be evaluated based on an output of components such as a perception component, a localization component, a prediction component, and the like. Thus, the model component 202 can include one or more thresholds 220, whereby actions can be selected or determined based on the data metric and the threshold 220, as discussed herein.

As noted above, in some examples a data metric can be based at least in part on the data points 212 and 214. In some examples, a data metric can be an aggregated data metric based at least in part on individual data metrics based on data point pairs.

In some examples, a data metric can be based at least in part on data associated with regions 222 and 224. For example, a contrast metric can be based at least in part on an average intensity value associated with the region 222 and an average intensity value associated with the region 224. Of course, other statistical information can be determined for regions such as median, mode, weighted averages, and the like.

In some examples, a data metric can be based at least in part on data associated with a region 226. For example, the region 226 may include data representing regions of different color, material, and the like. In some examples, the data metric may be based on a gradient, root-mean-square deviation, and the like associated with the region 226.

In some examples, a data metric can be based at least in part on a number or locations of edges and/or corners represented in the ROI 210. In some examples, a data metric can be based at least in part on one or more algorithms such as SURF (speeded up robust features), SIFT (scale-invariant feature transform), AKAZE (accelerated-KAZE), and the like. In some examples, the data metric can be based on mapping baseline edges (or features) (e.g., based on a calibration) with newly detected edges (or features).

The illustration 200 further includes a second example of image data 228 representing degraded sensor data. As illustrated, the image data 228 represents a defocusing error, although other errors are contemplated. Data metrics can be determined based on the image data 228. For example, the region of interest (ROI) 210 can be received, whereby at least a portion of the ROI 210 can comprise a portion of the vehicle. In the image data 228, a data metric can be evaluated based on individual points or regions within the ROI 210.

In some examples, the data metrics determined based on the image data 228 can be the same as data metrics determined based on the image data 208. Thus, data metrics can be evaluated over time to observe a performance of the sensor and/or to predict a probability associated with a failure associated with a sensor. A data metric 230 can be represented in the model component 202 as being below the threshold 220, which may indicate the sensor data is associated with a degraded state.

As the ROI 210 can be received or otherwise predetermined (e.g., based on a calibration operation), the data metrics associated with the image data 228 can be based at least in part on the data points 214 and 216 and/or the regions 222, 224, and/or 226.

Thus, the techniques can include determining various data metrics of sensor data over time to determine a degraded state associated with sensor data and/or to predict a degraded state associated with sensor data based on determined model.

Figure 3:
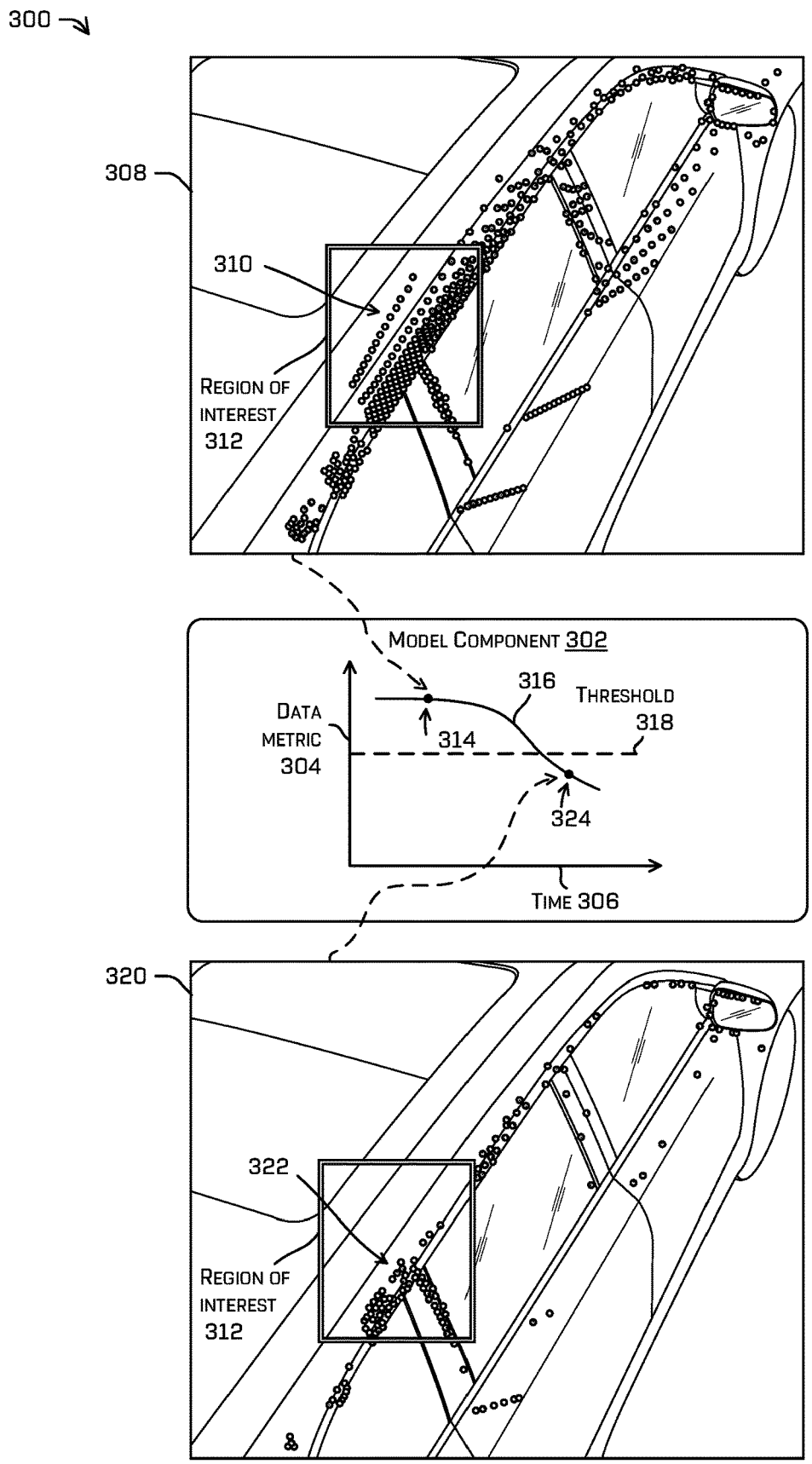
FIG. 3 is an illustration of an example model component based on data metrics associated with lidar data.

FIG. 3 is an illustration 300 of an example model component based on data metrics associated with lidar data. For example, a model component 302 can represent data indicative of a data metric 304 associated with a sensor over time 306. The model component 302 can be generated based on captured data over time and/or captured data that has been degraded in simulation to represent a degraded sensor. Further, the model component 302 can include or represent a data metric based on environmental conditions such as ambient light, weather, temperature, time, location, and the like.

The illustration 300 includes a first example 308 of a perspective view of lidar data 310 representing normal sensor data. Data metrics can be determined based on the lidar data 310. For example, a region of interest (ROI) 312 can be received, whereby at least a portion of the ROI 312 can comprise a portion of the vehicle. In the lidar data 310, a data metric can be evaluated based on individual points or regions within the ROI 312.

As illustrated, the ROI 312 includes a plurality of data points associated with the lidar data 310. Individual lidar points of the lidar data 310 can be associated with a channel or beam index, an azimuth bin or angle, an intensity value, and/or a distance. Data metrics for data associated with the ROI 312 can be aggregated and/or can be determined based on a calibration operation which can establish a baseline metric, such as a number of points associated with the ROI, an average intensity value associated with the ROI 312, an intensity distribution associated with the ROI 312 (e.g., a gradient), distance value(s) or range(s) associated with data associated with the ROI 312, and the like. Further, the calibration operation can be performed over a variety of environmental conditions (e.g., ambient light, time of data, temperature, weather, and the like) to allow for normalization of data.

In normal operations (e.g., illustrated by the first example 308) a data metric may be expected to fall within a particular range (e.g., based on empirical studies and/or simulation data). For example, a data metric 314 associated with the lidar data 310 is illustrated in the model component 302 on a curve 316. As discussed herein, lidar data associated with various data metrics can be evaluated based on an output of components such as a perception component, a localization component, a prediction component, and the like. Thus, the model component 302 can include one or more thresholds 318, whereby actions can be selected or determined based on the data metric and the threshold 318, as discussed herein.

In some examples, a data metric can be based at least in part on a comparison between captured data and a reference data (e.g., using an iterative closest point (ICP) algorithm). For example, a calibration operation can determine a baseline surface or a reference surface for comparing captured sensor data (e.g., the lidar data 310 associated with the ROI 312) with reference data or a reference surface. A data metric may be based at least in part on a difference between a shape and/or orientation of the captured data differs from the reference data.

In some examples, determining a data metric can include determining a plane based on the captured lidar data 310 and/or determining a principal component analysis on the data to determine a normal vector. A data metric can be based on a difference between an orientation of the normal vector associated with the captured data and a reference normal vector (e.g., based on a calibration operation).

The illustration 300 further includes a second example 320 of lidar data 322 representing degraded sensor data. As illustrated, the lidar data 322 represents a lens error, although other errors are contemplated. Data metrics can be determined based on the lidar data 322. For example, the region of interest (ROI) 312 can be received, whereby at least a portion of the ROI 312 can comprise a portion of the vehicle. In the lidar data 322, a data metric can be evaluated based on individual points or regions within the ROI 312. For example, the number of lidar points associated with the ROI 312 (and/or associated with a particular channel or beam index and/or an azimuth angle or bin) can be compared relative to a threshold value (e.g., as determined by a calibration operation). Similar comparisons can be made with respect to intensity values.

In some examples, a data metric can be based at least in part on a number of data points and an intensity value. For example, a data number of data points having an intensity value meeting or exceeding a first threshold can be determined. That number of data points can be determined with respect to a second threshold, and a determination of whether the sensor is associated with a degraded state can be based at least in part on the first and/or second thresholds.

In some examples, the data metrics determined based on the lidar data 322 can be the same as data metrics determined based on the lidar data 310. Thus, data metrics can be evaluated over time to observe a performance of the sensor and/or to predict a probability associated with a failure associated with a sensor. A data metric 324 can be represented in the model component 302 as being below the threshold 318, which may indicate the sensor data is associated with a degraded state.

As the ROI 312 can be received or otherwise predetermined (e.g., based on a calibration operation), the data metrics associated with the ROI 312 can be based at least in part on the lidar data 310 and 322.

Thus, the techniques can include determining various data metrics of sensor data over time to determine a degraded state associated with sensor data and/or to predict a degraded state associated with sensor data based on determined model.

Figure 4:
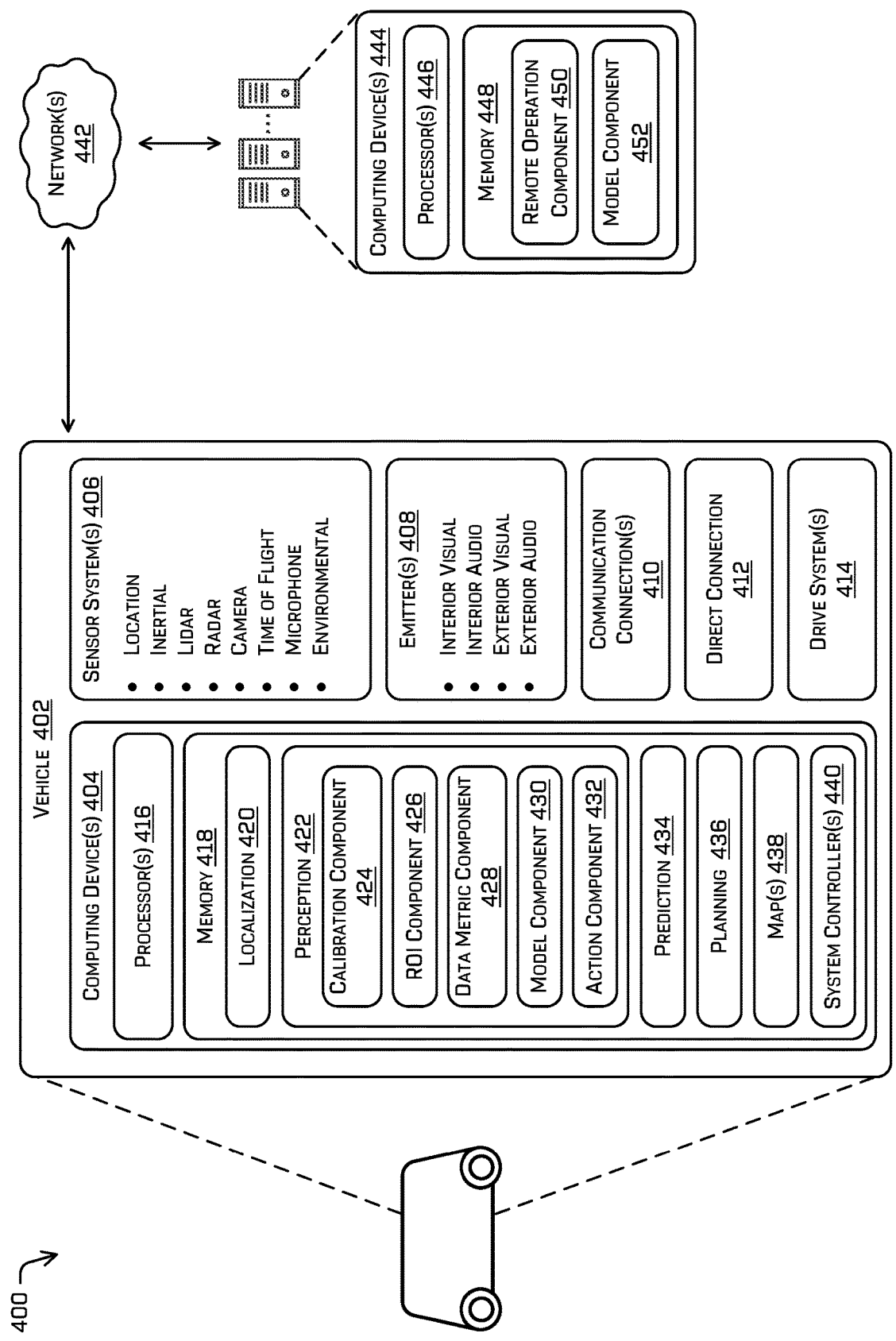
FIG. 4 is a block diagram of an example system for implementing the techniques described herein.

FIG. 4 is a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle.

The vehicle 402 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 can be configured to capture sensor data associated with an environment.

The one or more sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the computing device 404.

The vehicle 402 can also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include one or more communication connection(s) 410 that enable communication between the vehicle 402 and one or more other local or remote computing device(s) (e.g., a remote teleoperation computing device) or remote services. For instance, the one or more communication connection(s) 410 can facilitate communication with other local computing device(s) on the vehicle 402 and/or the one or more drive system(s) 414. Also, the one or more communication connection(s) 410 can allow the vehicle 402 to communicate with other nearby computing device(s) (e.g., other nearby vehicles, traffic signals, etc.).

The one or more communications connection(s) 410 can include physical and/or logical interfaces for connecting the computing device 404 to another computing device or one or more external networks 442 (e.g., the Internet). For example, the one or more communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage j unction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The computing device 404 can include one or more processor(s) 416 and memory 418 communicatively coupled with the one or more processor(s) 416. In the illustrated example, the memory 418 of the computing device 404 stores a localization component 420, a perception component 422 comprising a calibration component 424, a region of interest (ROI) component 426, a data metric component 428, a model component 430, and an action component 432, a prediction component 434, a planning component 436, a maps component 438, and one or more system controller(s) 440. Though depicted as residing in the memory 418 for illustrative purposes, it is contemplated that the localization component 420, the perception component 422, the calibration component 424, the ROI component 426, the data metric component 428, the model component 430, the action component 432, the prediction component 434, the planning component 436, the maps component 438, and the one or more system controller(s) 440 can additionally, or alternatively, be accessible to the computing device 404 (e.g., stored in a different component of vehicle 402) and/or be accessible to the vehicle 402 (e.g., stored remotely).

In memory 418 of the computing device 404, the localization component 420 can include functionality to receive data from the sensor system(s) 406 to determine a position of the vehicle 402. For example, the localization component 420 can include and/or request/receive a three-dimensional map of an environment and can continuously determine a location of the autonomous vehicle within the map. In some instances, the localization component 420 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 420 can provide data to various components of the vehicle 402 to determine an initial position of an autonomous vehicle for generating a trajectory, as discussed herein.

The perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional and/or alternative examples, the perception component 422 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 422 can use perception algorithms to determine a perception-based bounding box associated with an object in the environment based on sensor data. For example, the perception component 422 can receive image data and classify the image data to determine that an object is represented in the image data. Then, using detection algorithms, the perception component 422 can generate a two-dimensional bounding box and/or a perception-based three-dimensional bounding box associated with the object. The perception component 422 can further generate a three-dimensional bounding box associated with the object. As discussed above, the three-dimensional bounding box can provide additional information such as a location, orientation, pose, and/or size (e.g., length, width, height, etc.) associated with the object.

The perception component 422 can include functionality to store perception data generated by the perception component 422. In some instances, the perception component 422 can determine a track corresponding to an object that has been classified as an object type. For purposes of illustration only, the perception component 422, using sensor system(s) 406 can capture one or more images of an environment. The sensor system(s) 406 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The calibration component 424 can include functionality to calibrate a sensor in known conditions to determine a region of interest, baseline data metrics, a reference surface, and the like. For example, the calibration component 424 can receive an indication of a pose (e.g., an orientation) of a sensor relative to the vehicle and/or relative to other sensors in the environment. Starting from a known orientation of the sensor, the calibration component can determine a region of interest that corresponds to a portion of the vehicle. Further, the calibration component can determine baseline metrics associated with the sensor, such as baseline contrast metric(s), threshold numbers of points, distances, and/or intensities, and the like. In some examples, the calibration component can determine performance metrics of a sensor as it relates to an output of subsequent processing operations, such as a localization component, a perception component, a prediction component, a planning component, and the like. In some examples.

The ROI component 426 can include functionality to receive an indication of a region of interest (ROI) associated with sensor data. In the context of image data, the ROI component 426 may provide an indication of image coordinates associated with individual pixels and/or regions of image data. In the context of lidar data, the ROI component 426 may provide an indication of a channel or beam index and an azimuth angle and/or bin associated with lidar data. Thus, the ROI component 426 can use predetermined information (e.g., such as geometric information) to determine a ROI associated with a particular sensor. In some examples, a ROI can be based on a machine learned model trained to identify a ROI associated with a vehicle. As noted herein, in some examples, the ROI component 426 can determine an ROI based on information determined via a calibration operation.

The data metric component 428 can include functionality to determine data metric(s) from sensor data associated with an ROI. In the context of image data, data metric(s) can include, but are not limited to, one or more of a contrast metric (e.g., based on intensity data from different portions within the ROI), a gradient, a number or location of edges within the ROI, an absence or presence of corners, combinations of data metrics, and the like. In the context of a lidar sensor, data metric(s) can include, but are not limited to, a number of lidar points within the ROI, an intensity value of data within the ROI, a distance associated with data in the ROI, a comparison between captured data and a reference data (e.g., using an iterative closest point (ICP) algorithm), combinations of data metrics, and the like.

In some examples, the data metric component 428 can determine data metrics based on metrics from a single sensor, from plural sensors of a same type (e.g., from multiple image sensors, multiple lidar sensors), and/or across sensors of different types (e.g., based on metrics from image sensor(s) and lidar sensor(s), and the like). For example, in some cases, data metrics may be correlated or otherwise evaluated across sensor modalities to evaluate sensor operation, sensor degradation, environmental conditions, and the like.

The model component 430 can include functionality to access model(s) associated with data metric(s), threshold(s), and/or time period(s), and/or to evaluate data metrics with respect to such data models. In some examples, a model may comprise one or more thresholds associating or correlating data metric(s) and action(s), as discussed herein. In some examples, the model component 430 may comprise a predictive model evaluating a data metric over time to determine a lifetime and/or maintenance interval associated with a sensor. In some examples, a model may be based at least in part on environmental characteristics to normalize a data metric based on such environmental data. For example, a contrast metric may vary based on ambient lighting.

The action component 432 can include functionality to select or otherwise determine an action based on a data metric, as discussed herein. Example actions may include, but are not limited to, one or more of reducing a confidence level associated with one or more of the sensor data or data derived from the sensor data, sending an indication of the data metric to a remote computing device, sending a request associated with a maintenance operation to the remote computing device, initiating a sensor cleaning operation, modifying a trajectory to slow the vehicle, generating a trajectory to stop the vehicle, and the like.

The prediction component 434 can generate one or more probability maps representing prediction probabilities of possible locations of one or more objects in an environment. For example, the prediction component 434 can generate one or more probability maps for vehicles, pedestrians, animals, and the like within a threshold distance from the vehicle 402. In some instances, the prediction component 434 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 436 can determine a path for the vehicle 402 to follow to traverse through an environment. For example, the planning component 436 can determine various routes and paths and various levels of detail. In some instances, the planning component 436 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 436 can generate an instruction for guiding the autonomous vehicle along at least a portion of the route from the first location to the second location. In at least one example, the planning component 436 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 436 can alternatively, or additionally, use data from the perception component 422 and/or the prediction component 434 to determine a path for the vehicle 402 to follow to traverse through an environment. For example, the planning component 436 can receive data from the perception component 422 and/or the prediction component 434 regarding objects associated with an environment. Using this data, the planning component 436 can determine a route to travel from a first location (e.g., a current location) to a second location (e.g., a target location) to avoid objects in an environment. In at least some examples, such a planning component 436 may determine there is no such collision free path and, in turn, provide a path which brings vehicle 402 to a safe stop avoiding all collisions and/or otherwise mitigating damage.

The memory 418 can further include one or more maps 438 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 438 can include at least one map (e.g., images and/or a mesh). In some examples, the vehicle 402 can be controlled based at least in part on the map(s) 438. That is, the map(s) 438 can be used in connection with the localization component 420, the perception component 422 (and sub-components), the prediction component 434, and/or the planning component 436 to determine a location of the vehicle 402, identify objects in an environment, generate prediction probabilit(ies) associated with objects and/or the vehicle 402, and/or generate routes and/or trajectories to navigate within an environment.

In at least one example, the computing device 404 can include one or more system controller(s) 440, which can be configured to control steering, propulsion, braking, safety, emitters, communication, and other systems of the vehicle 402. These system controller(s) 440 can communicate with and/or control corresponding systems of the drive system(s) 414 and/or other components of the vehicle 402, which may be configured to operate in accordance with a path provided from the planning component 436.

The vehicle 402 can connect to computing device(s) 444 via network 442 and can include one or more processor(s) 446 and memory 448 communicatively coupled with the one or more processor(s) 446. In at least one instance, the one or more processor(s) 446 can be similar to the processor(s) 416 and the memory 448 can be similar to the memory 418. In the illustrated example, the memory 448 of the computing device(s) 444 stores a remote operation component 450 and/or a model component 452. In at least one instance, the model component 452, after empirical testing and/or simulations, can be similar to the model component 430. Though depicted as residing in the memory 448 for illustrative purposes, it is contemplated that the remote operation component 450 and the model component 452 can additionally, or alternatively, be accessible to the computing device(s) 444 (e.g., stored in a different component of computing device(s) 444 and/or be accessible to the computing device(s) 444 (e.g., stored remotely).

As discussed herein, the remote operation component 450 can include functionality to receive an indication of data metric(s), sensor data associated with such data metric(s), and/or a request for preventative maintenance. In some examples, the remote operation component 450 can schedule a maintenance operation based on a data metric or a determination by the vehicle 402 that a data metric is indicative of a degraded state. In some examples, a remote operation component 450 can include teleoperators or operators who can control the vehicle 402 or can provide instructions to the vehicle based on a data metric.

The model component 452 can include functionality to generate models for evaluating sensor metrics, as discussed herein. For example, the model component 452 can receive sensor data and can determine data metrics associated with such sensor data. The model component 452 can aggregate data across a plurality of vehicles (e.g., a fleet of vehicles) to determine data metrics indicative of normal operations and data metrics indicative of degraded operations. Further, the model component 452 can associate data metrics with a time period of operating a sensor and a performance of components associated with such metrics to determine a predictive maintenance schedule associated with various sensors, as discussed herein. In some examples, the model component 452 can determine one or more models based real sensor data (including various levels of degradation), real sensor data with simulated degradation, and/or sensor data. Further, the model component 452 can associated models with environmental conditions to normalize models with respect to other factors (e.g., ambient light, weather, location, time of day, temperature, and the like).

The processor(s) 416 of the computing device 404 and the processor(s) 446 of the computing device(s) 444 can be any suitable processor capable of executing instructions to process data and perform operations as described herein. By way of example and not limitation, the processor(s) 416 and 446 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 computing device 404 and the memory 448 of the computing device(s) 444 are examples of non-transitory computer-readable media. The memory 418 and 448 can store an operating system and one or more software applications, instructions, programs, and/or data to implement the methods described herein and the functions attributed to the various systems. In various implementations, the memory 418 and 448 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 418 and 448 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomies 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Accordingly, the techniques discussed herein provide a robust implementation of determining data metric(s) associated with a sensor to determine a degraded state of the sensor to allow the safe operation of an autonomous vehicle.

Figure 5:
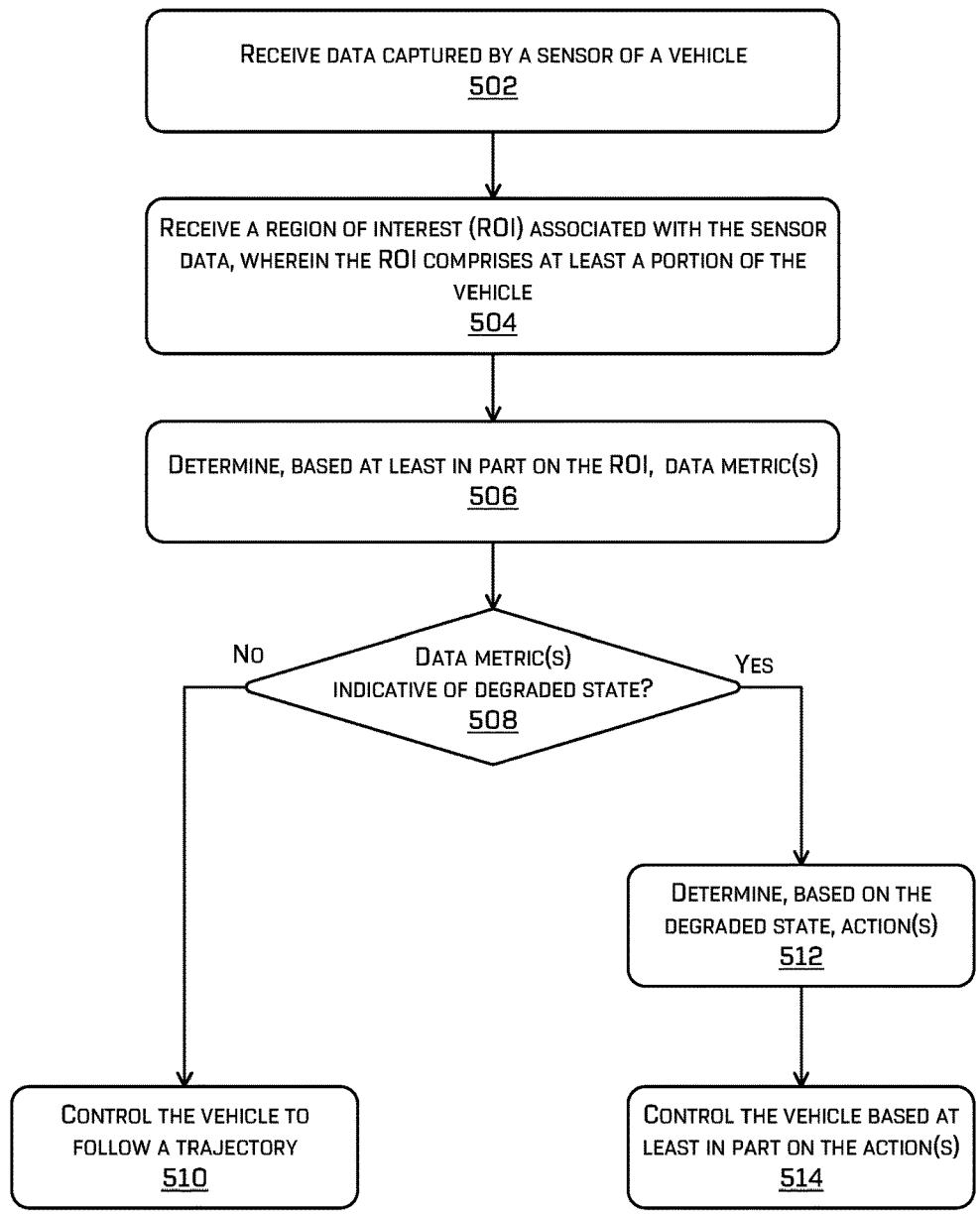
FIG. 5 is an example process for determining a data metric associated with sensor data and controlling a vehicle based at least in part on the data metric.

FIG. 5 illustrates an example process in accordance with examples of the disclosure. This process is illustrated a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 is an example process 500 for determining a data metric associated with sensor data and controlling a vehicle based at least in part on the data metric. For example, some or all of the process 500 can be performed by one or more components in FIG. 4, as described herein. For example, some or all of the process 500 can be performed by the perception component 422.

At operation 502, the process can include receiving data captured by a sensor of a vehicle. In some examples, the operation 502 can include receiving or capturing lidar data from one or more lidar sensors of an autonomous vehicle as the autonomous vehicle traverses an environment. In some examples, the operation 502 can include receiving or capturing image data from one or more image sensors of an autonomous vehicle as the autonomous vehicle traverses an environment. Of course, other sensor types are contemplated herein.

At operation 504, the process can include receiving a region of interest (ROI) associated with the sensor data, wherein the ROI comprises at least a portion of the vehicle. As discussed herein, an image sensor may be oriented such that a portion of the vehicle (such as a sideview mirror, a sensor pod, a hood or other surface of the vehicle) is captured by the sensor data. Similarly, other sensors such as lidar sensors, time of flight sensors, radar sensors, sonar sensors, etc., can capture a portion of a vehicle. As noted herein, in some examples the ROI can be predetermined based on a calibration operation such that the ROI is received or otherwise determined based on predetermined information. In some examples, a ROI can be based on image coordinates, lidar beam indices or azimuth angles, and the like.

At operation 506, the process can include determining, based at least in part on the ROI, data metric(s). As noted herein, in the context of image data, data metric(s) can include, but are not limited to, one or more of a contrast metric (e.g., based on intensity data from different portions within the ROI), a gradient, a number or location of edges within the ROI, an absence or presence of corners, combinations of data metrics, and the like. In the context of a lidar sensor, data metric(s) can include, but are not limited to, a number of lidar points within the ROI, an intensity value of data within the ROI, a distance associated with data in the ROI, a comparison between captured data and a reference data (e.g., using an iterative closest point (ICP) algorithm), combinations of data metrics, and the like.

At operation 508, the process can include determining if the data metric(s) are indicative of a degraded state. The operation 508 can include evaluating the data metric(s) with respect to other data metric(s), normalization data (e.g., ambient light, weather, location, temperature, sensor age, time of data, and the like), and/or one or more models and/or thresholds. If the data metric(s) are not indicative of a degraded state (e.g., "no" in the operation 508) the process continues to operation 510.

At operation 510, the process can include controlling the vehicle to follow a trajectory. For example, the operation 510 can include receiving a trajectory from a planning component and controlling an acceleration and/or steering angle of the vehicle to follow the trajectory. In this example, because the data metric is does not indicate a degraded state, the trajectory may be followed as planned without reductions in speed or alterations in steering angles to traverse around obstacles (e.g., giving a wider berth to obstacles in the environment).

Returning to the operation 508, if the data metric(s) are indicative of a degraded state (e.g., "yes" at the operation 508), the process continues to operation 512.

At operation 512, the process can include determining, based at least in part on the degraded state, one or more actions. Example actions may include, but are not limited to, one or more of reducing a confidence level associated with one or more of the sensor data or data derived from the sensor data, sending an indication of the data metric to a remote computing device, sending a request associated with a maintenance operation to the remote computing device, initiating a sensor cleaning operation, modifying a trajectory to slow the vehicle, generating a trajectory to stop the vehicle, and the like.

At operation 514, the process can include controlling a vehicle based at least in part on the action(s). Accordingly, a state of a sensor and/or a state of an environment can be considered while controlling a vehicle in an environment to improve safety outcomes for passengers and other vehicles and objects in the environment.

Example Clauses

A: A system comprising: one or more processors; and one or more non-transitory computer-readable media storing computer-executable instructions that, when executed, cause the one or more processors to perform operations comprising: receiving sensor data from a sensor associated with an autonomous vehicle; receiving a region of interest associated with the sensor data, wherein the region of interest comprises at least a portion of the autonomous vehicle; determining, based at least in part on the sensor data associated with the region of interest, a data metric associated with the sensor data; determining that the data metric is indicative of a degraded state associated with the sensor; determining, based on the degraded state associated with the sensor, an action; and controlling the autonomous vehicle based at least in part on the action.

B: The system of paragraph A, wherein the sensor comprises an image sensor and wherein determining the data metric comprises: determining first intensity data associated with a first region of the region of interest; determining second intensity data associated with a second region of the region of interest that is different than the first region of the region of interest; and determining the data metric based at least in part on the first intensity data and the second intensity data.

C: The system of paragraph A or B, wherein the sensor comprises a lidar sensor and wherein determining the data metric comprises: determining intensity data based at least in part on lidar data associated with the region of interest; determining a number of lidar returns associated with the region of interest; and determining the data metric based at least in part on the intensity data and the number of lidar returns.

D: The system of any of paragraphs A-C, the operations further comprising: determining one or more of an extrinsic or intrinsic calibration for the sensor; determining, based at least in part on the one or more of the extrinsic or intrinsic calibration, a baseline metric associated with the sensor; determining, based at least in part on the baseline metric, a threshold associated with the data metric; and determining that the data metric is indicative of the degraded state based at least in part on the data metric with respect to the threshold.

E: The system of any of paragraphs A-D, wherein the action comprises at least one of: reducing a confidence level associated with one or more of the sensor data or data derived from the sensor data; sending an indication of the degraded state to a remote computing device; initiating a sensor cleaning operation; modifying a trajectory to slow the autonomous vehicle; or generating a trajectory to stop the autonomous vehicle.

F: A method comprising: receiving sensor data captured by a sensor of a vehicle; receiving a region of interest associated with the sensor data, wherein the region of interest comprises at least a portion of the vehicle; determining, based at least in part on the sensor data associated with the region of interest, a data metric associated with a degraded state; determining, based at least in part on the data metric, an action; and controlling the vehicle based at least in part on the action.

G: The method of paragraph F, wherein the sensor comprises an image sensor and wherein determining the data metric comprises: determining first intensity data associated with a first region of the region of interest; determining second intensity data associated with a second region of the region of interest; and determining the data metric based at least in part on the first intensity data and the second intensity data.

H: The method of paragraph F or G, wherein the sensor comprises an image sensor and wherein the data metric is associated with at least one of: a pixel value of a channel of a plurality of channels associated with the region of interest; a number of features associated with the region of interest; a gradient associated with the region of interest; or a root-mean-square deviation associated with the region of interest.

I: The method of any of paragraphs F-H, further comprising: determining one or more of an extrinsic or intrinsic calibration for the sensor; wherein the region of interest is based at least in part on image coordinates associated with the sensor data; and wherein the image coordinates are based at least in part on the one or more of an extrinsic or intrinsic calibration for the sensor.

J: The method of any of paragraphs F-I, wherein the sensor comprises a lidar sensor and wherein determining the data metric comprises: determining intensity data based at least in part on lidar data associated with the region of interest; determining a number of lidar returns associated with the region of interest; and determining the data metric based at least in part on the intensity data and the number of lidar returns.

K: The method of paragraph J, further comprising: determining depth data based at least in part on the lidar data; determining a difference between the depth data and reference depth data; determining that the difference meets or exceeds a threshold; and determining the data metric further based at least in part on the difference meeting or exceeding the threshold.

L: The method of paragraph J or K, further comprising: determining one or more of an extrinsic or intrinsic calibration for the lidar sensor; wherein the region of interest is based at least in part on channel data and azimuth data associated with the lidar data; and wherein the channel data and the azimuth data are based at least in part on the one or more of the extrinsic or intrinsic calibration.

M: The method of any of paragraphs F-L, further comprising: determining an environmental characteristic associated with an environment proximate to the vehicle, wherein the environment characteristic comprises one or more of: a time of day; ambient light data; weather data; or location data; wherein determining the data metric is further based at least in part on the environmental characteristic.

N: The method of any of paragraphs F-M, further comprising: determining, as data metric history data, the data metric over a period of time; wherein determining the action is further based at least in part on the data metric history data.

O: The method of any of paragraphs F-N, wherein the action comprises at least one of: reducing a confidence level associated with one or more of the sensor data or data derived from the sensor data; sending an indication of the data metric to a remote computing device; sending a request associated with a maintenance operation to the remote computing device; initiating a sensor cleaning operation; modifying a trajectory to slow the vehicle; or generating a trajectory to stop the vehicle.

P: One or more non-transitory computer-readable media storing instructions executable by a processor, wherein the instructions, when executed, cause the processor to perform operations comprising: receiving sensor data captured by a sensor of a vehicle; receiving a region of interest associated with the sensor data, wherein the region of interest comprises at least a portion of the vehicle; determining, based at least in part on the sensor data associated with the region of interest, a data metric associated with a degraded state; determining, based at least in part on the data metric, an action; and performing the action.

Q: The one or more non-transitory computer-readable media of paragraph P, wherein the sensor comprises an image sensor and wherein determining the data metric comprises: determining first intensity data associated with a first region of the region of interest; determining second intensity data associated with a second region of the region of interest; and determining the data metric based at least in part on the first intensity data and the second intensity data.

R: The one or more non-transitory computer-readable media of paragraph P or Q, wherein the sensor comprises a lidar sensor and wherein determining the data metric comprises: determining intensity data based at least in part on lidar data associated with the region of interest; determining a number of lidar returns associated with the region of interest; and determining the data metric based at least in part on the intensity data and the number of lidar returns.

S: The one or more non-transitory computer-readable media of any of paragraphs P-R, the operations further comprising: determining an environmental characteristic associated with an environment proximate to the vehicle, wherein the environment characteristic comprises one or more of: a time of day; ambient light data; weather data; or location data; wherein determining the data metric is further based at least in part on the environmental characteristic.

T: The non-transitory computer-readable media of any of paragraphs P-S, wherein the action comprises at least one of: reducing a confidence level associated with one or more of the sensor data or data derived from the sensor data; sending an indication of the data metric to a remote computing device; sending a request associated with a maintenance operation to the remote computing device; initiating a sensor cleaning operation; modifying a trajectory to slow the vehicle; or generating a trajectory to stop the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
receiving sensor data from a sensor associated with an autonomous vehicle in an environment;
receiving a region of interest represented in the sensor data, wherein the region of interest represents at least a portion of a surface of the autonomous vehicle;
determining, based at least in part on the sensor data associated with the surface of the autonomous vehicle, a data metric associated with the sensor data;
determining that the data metric is indicative of a degraded state associated with the sensor;
determining, based on the degraded state associated with the sensor, an action; and
controlling the autonomous vehicle based at least in part on the action;
wherein at least one of:
the sensor comprises an image sensor and wherein the data metric is associated with at least one of:
a pixel value of a channel of a plurality of channels associated with the region of interest;
a number of features associated with the region of interest;
a gradient associated with the region of interest; or
a root-mean-square deviation associated with the region of interest; or
the sensor comprises a lidar sensor and wherein determining the data metric comprises:
determining intensity data based at least in part on lidar data associated with the region of interest;

determining a number of lidar returns associated with the region of interest; and determining the data metric based at least in part on the intensity data and the number of lidar returns.

2. The system of claim 1, wherein the data metric is a first data metric and wherein the sensor comprises the image sensor, the operations further comprising:

determining first intensity data associated with a first region of the region of interest;

determining second intensity data associated with a second region of the region of interest that is different than the first region of the region of interest; and determining a second data metric based at least in part on the first intensity data and the second intensity data.

3. The system of claim 1, the operations further comprising:

determining one or more of an extrinsic or intrinsic calibration for the sensor;

determining, based at least in part on the one or more of the extrinsic or intrinsic calibration, a baseline metric associated with the sensor;

determining, based at least in part on the baseline metric, a threshold associated with the data metric; and determining that the data metric is indicative of the degraded state based at least in part on the data metric with respect to the threshold.

4. The system of claim 1, wherein the action comprises at least one of:

reducing a confidence level associated with one or more of the sensor data or data derived from the sensor data;

sending an indication of the degraded state to a remote computing device;

initiating a sensor cleaning operation;

modifying a trajectory to slow the autonomous vehicle; or generating a trajectory to stop the autonomous vehicle.

5. A method performed by one or more processors, the method comprising:

receiving sensor data captured by a sensor of a vehicle in an environment;

receiving a region of interest represented in the sensor data, wherein the region of interest represents at least a portion of a surface of the vehicle;

determining, based at least in part on the sensor data associated with the region of interest, a data metric associated with a degraded state;

determining, based at least in part on the data metric, an action; and controlling the vehicle based at least in part on the action, wherein at least one of:

the sensor comprises an image sensor and wherein the data metric is associated with at least one of:

a pixel value of a channel of a plurality of channels associated with the region of interest;

a number of features associated with the region of interest;

a gradient associated with the region of interest; or a root-mean-square deviation associated with the region of interest; or the sensor comprises a lidar sensor and wherein determining the data metric comprises:

determining intensity data based at least in part on lidar data associated with the region of interest;

determining a number of lidar returns associated with the region of interest; and determining the data metric based at least in part on the intensity data and the number of lidar returns.

6. The method of claim 5, wherein the data metric is a first metric and wherein the sensor comprises the image sensor, the method further comprising:

determining first intensity data associated with a first region of the region of interest;

determining second intensity data associated with a second region of the region of interest; and determining a second data metric based at least in part on the first intensity data and the second intensity data.

7. The method of claim 5, further comprising:

determining one or more of an extrinsic or intrinsic calibration for the sensor;

wherein the region of interest is based at least in part on image coordinates associated with the sensor data; and wherein the image coordinates are based at least in part on the one or more of an extrinsic or intrinsic calibration for the sensor.

8. The method of claim 5, wherein the sensor comprises the lidar sensor, the method further comprising:

determining depth data based at least in part on the lidar data;

determining a difference between the depth data and reference depth data;

determining that the difference meets or exceeds a threshold; and determining the data metric further based at least in part on the difference meeting or exceeding the threshold.

9. The method of claim 5, wherein the sensor comprises the lidar sensor, the method further comprising:

determining one or more of an extrinsic or intrinsic calibration for the lidar sensor;

wherein the region of interest is based at least in part on channel data and azimuth data associated with the lidar data; and wherein the channel data and the azimuth data are based at least in part on the one or more of the extrinsic or intrinsic calibration.

10. The method of claim 5, further comprising:

determining an environmental characteristic associated with an environment proximate to the vehicle, wherein the environment characteristic comprises one or more of:

a time of day;

ambient light data;

weather data; or location data;

wherein determining the data metric is further based at least in part on the environmental characteristic.

11. The method of claim 5, further comprising:

determining, as data metric history data, the data metric over a period of time;

wherein determining the action is further based at least in part on the data metric history data.

12. The method of claim 5, wherein the action comprises at least one of:

reducing a confidence level associated with one or more of the sensor data or data derived from the sensor data;

sending an indication of the data metric to a remote computing device;

sending a request associated with a maintenance operation to the remote computing device;

initiating a sensor cleaning operation;

modifying a trajectory to slow the vehicle; or generating a trajectory to stop the vehicle.

13. One or more non-transitory computer-readable media storing instructions executable by one or more processors, wherein the instructions, when executed, cause the one or more processors to perform operations comprising:

receiving sensor data captured by a sensor of a vehicle in an environment;

receiving a region of interest represented in the sensor data, wherein the region of interest represents at least a portion of a surface of the vehicle;

determining, based at least in part on the sensor data associated with the region of interest, a data metric associated with a degraded state;

determining, based at least in part on the data metric, an action; and performing the action, wherein at least one of:

the sensor comprises an image sensor and wherein the data metric is associated with at least one of:

a pixel value of a channel of a plurality of channels associated with the region of interest;

a number of features associated with the region of interest;

a gradient associated with the region of interest; or a root-mean-square deviation associated with the region of interest; or the sensor comprises a lidar sensor and wherein determining the data metric comprises:

determining intensity data based at least in part on lidar data associated with the region of interest;

determining a number of lidar returns associated with the region of interest; and determining the data metric based at least in part on the intensity data and the number of lidar returns.

14. The one or more non-transitory computer-readable media of claim 13, wherein the data metric is a first data metric and wherein the sensor comprises the image sensor, the operations further comprising:

determining first intensity data associated with a first region of the region of interest;

determining second intensity data associated with a second region of the region of interest; and determining a second data metric based at least in part on the first intensity data and the second intensity data.

15. The one or more non-transitory computer-readable media of claim 13, the operations further comprising:

determining an environmental characteristic associated with an environment proximate to the vehicle, wherein the environment characteristic comprises one or more of:

a time of day;
ambient light data;
weather data; or
location data;

wherein determining the data metric is further based at least in part on the environmental characteristic.

16. The one or more non-transitory computer-readable media of claim 13, wherein the action comprises at least one of:

reducing a confidence level associated with one or more of the sensor data or data derived from the sensor data;

sending an indication of the data metric to a remote computing device;

sending a request associated with a maintenance operation to the remote computing device;

initiating a sensor cleaning operation;

modifying a trajectory to slow the vehicle; or generating a trajectory to stop the vehicle.

* * * * *